Figure 1:
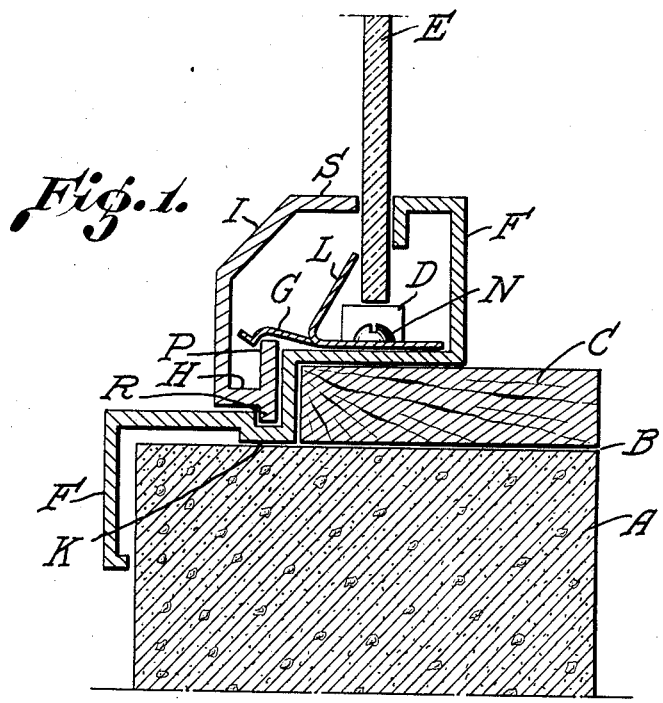
Figure 2:
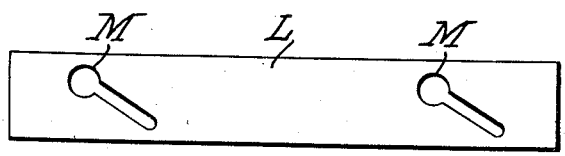
Figure 4:
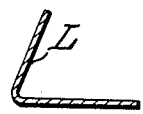
Figure 3:
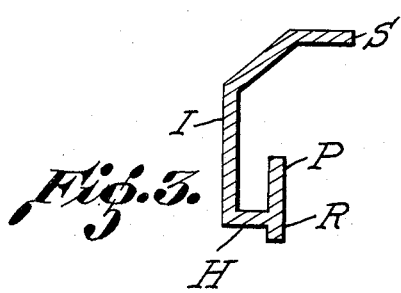

Oct. 24, 1939.   J. I. HASKEL   2,177,037
WINDOW FRAME
Filed Nov. 26, 1937

Inventor:
Josef Isak Haskel

Patented Oct. 24, 1939

2,177,037

UNITED STATES PATENT OFFICE 2,177,037

WINDOW FRAME

Josef Isak Haskel, Stockholm, Sweden, assignor to Maud Harriet Haskel and Arne Gullander, both of Stockholm, Sweden Application November 26, 1937, Serial No. 176,531
In Sweden November 27, 1936

2 Claims. (Cl. 20—56.4)

Window panes, particularly large ones, are usually held in position by being firmly and rigidly fixed in the frame, and no effective protection is thus provided against stresses in the glass due to expansion, vibration, or other causes. Certain other window frame constructions are also known, consisting mainly of a framework, a loose strip, and a loose spring; such frames, however, are either of very complicated construction, difficult to fit or to take down, or else the pane is not held elastically, yet perfectly steady and secure, in its position in such frames.

My present invention relates to a window frame particularly suitable to receive and retain large window panes, the pane being held elastically by two profile strips, of which one is removable. The object of the invention is to hold the pane firmly but elastically in position when put in, the elasticity of the holding device protecting it against stresses due to bending or jars, facilitating also the removal and putting in of the pane, while at the same time giving the whole window an attractive appearance from the outside of the building.

One form of the invention is illustrated in the attached drawing, which shows the device in cross section, and three cross sections of component parts.

The invention consists mainly of an iron girder C, or the like, fixed to a structure A of masonry, concrete, metal, or the like, an insulating and damping packing B being fitted between the girder C and the carrying structure A. A profile strip F of metal or other material, provided with a groove K, is attached by screws N to the side of the girder C that is turned away from the carrying structure A; to the profile strip F is firmly fixed a profiled leaf spring G, the free end of which projects beyond that part of the profile strip F to which it is firmly fixed. The glass pane E is placed on shock absorbing supporting blocks D of light metal foil or other frictionless elastic material, whereupon a V-shaped guide strip L of metal or other material, provided with slots M and movable on studs or the like fixed on the profile strip F, is pushed close to the pane in such a way that the free margin of the guide strip L secures the glass pane E in position; a loose profile strip I, one margin H of which is T-shaped with two arms P and R, is then attached to the fixed profile strip F by placing the arm R in the groove K of the fixed profile strip F and pressing in the arm P under the free end of the spring G, which will then keep the arms P—R pressed into the groove K of the fixed profile strip F; the glass pane E resting in the frame will then be held against the free end of the fixed profile strip F by the free end S of the loose profile strip I, to the end that the glass pane E, protected from stresses due to jars, changes of temperature, or the like, may be kept in position and be removed from or put into the window frame without waste of material simply by releasing the profile strip I from or exposing it to the pressure exerted by the spring G against the groove K of the fixed profile strip F.

The invention may of course be applied in many forms without abandoning the fundamental idea; the loose profile strip, for example, may be designed as a series of springs, the profile strip F and the spring G can be fixed in other ways, or be of different shape.

Having thus described my invention, what I claim and desire to protect by Letters Patent is:

1. A window frame, particularly suitable for surrounding and holding large glass panes, in which a profile strip made of metal or other suitable material, rigidly attached to the supporting structure, is in elastic cooperation with a block serving as a shock-absorbing support for the glass pane and a leaf spring acting upon a loose profile strip, and characterized by that margin H of the loose profile strip I which is pressed against the fixed profile strip F being designed in the shape of a T, one arm R of which in the locked position enters a groove K in the fixed profile strip F and the other arm P of which in that position is held by the pressure of the spring G, firmly attached to the fixed profile strip F, so that a glass pane E when put into the window-frame is held by the free end S of the loose profile strip I against the free end of the fixed profile strip F, all to the end that the glass pane E shall be held in the desired position, protected against stresses in the material due to jars, changes of temperature, or the like, and can without loss of material be taken out from or put into the window frame simply by releasing the profile strip I from or exposing it to the pressure exerted by the spring G against the groove K of the fixed profile strip F.

2. A window frame, particularly suitable for surrounding and holding large glass panes, in which a profile strip made of metal or other suitable material, rigidly attached to the supporting structure is in elastic cooperation with a block serving as a shock-absorbing support for the glass pane and a leaf spring acting upon a loose profile strip, and characterized by a V-shaped guide strip L provided with slots M and movable on studs or the like fixed on the profile strip F in such a manner that the free margin L of the guide strip secures the glass pane E in position, more especially when the loose profile strip I is released from the pressure of the spring G.

JOSEF ISAK HASKEL.